(12) United States Patent
Larkiala

(10) Patent No.: US 12,350,610 B2
(45) Date of Patent: Jul. 8, 2025

(54) FILTER SYSTEM AND METHOD FOR FILTERING

(71) Applicant: AALTO UNIVERSITY FOUNDATION SR, Aalto (FI)

(72) Inventor: Sauli Larkiala, Aalto (FI)

(73) Assignee: AALTO UNIVERSITY FOUNDATION SR, Aalto (FI)

( * ) Notice: Subject to any disclaimer, the term of this patent is extended or adjusted under 35 U.S.C. 154(b) by 333 days.

(21) Appl. No.: 17/796,139

(22) PCT Filed: Jan. 27, 2021

(86) PCT No.: PCT/FI2021/050053
§ 371 (c)(1),
(2) Date: Jul. 28, 2022

(87) PCT Pub. No.: WO2021/152213
PCT Pub. Date: Aug. 5, 2021

(65) Prior Publication Data
US 2023/0058172 A1 Feb. 23, 2023

(30) Foreign Application Priority Data
Jan. 31, 2020 (FI) .................................... 20205104

(51) Int. Cl.
| | |
|---|---|
| *B01D 35/12* | (2006.01) |
| *B01D 29/52* | (2006.01) |
| *B01D 29/66* | (2006.01) |
| *B01D 36/00* | (2006.01) |

(52) U.S. Cl.
CPC ............. *B01D 35/12* (2013.01); *B01D 29/52* (2013.01); *B01D 29/668* (2013.01); *B01D 36/001* (2013.01); *B01D 2201/184* (2013.01); *B01D 2201/202* (2013.01)

(58) Field of Classification Search
CPC ...... B01D 35/12; B01D 29/52; B01D 29/668; B01D 36/001; B01D 2201/184; B01D 2201/202; B01D 37/04
See application file for complete search history.

(56) References Cited

U.S. PATENT DOCUMENTS

| | | | |
|---|---|---|---|
| 3,221,888 A | 12/1965 | Jacques | |
| 3,485,369 A | 12/1969 | Voorheis | |
| 3,519,133 A | 7/1970 | Broering | |

FOREIGN PATENT DOCUMENTS

| | | | | |
|---|---|---|---|---|
| DE | 3725773 A1 | * | 2/1989 | |
| DE | 202007015827 U1 | * | 4/2008 | ............... C02F 1/34 |
| WO | 2019145943 A1 | | 8/2019 | |

OTHER PUBLICATIONS

International Search report for PCT/FI2021/050053, prepared by the European Patent Office, mailing date Apr. 8, 2021, 3 pages.

* cited by examiner

*Primary Examiner* — Waqaas Ali
(74) *Attorney, Agent, or Firm* — Brooks Kushman P.C.

(57) ABSTRACT

A filter system and method for filtering. The filter system (SJ) having at least two filters (S1, S2) having filter elements for filtering a material to be filtered. The material to be filtered is conducted to a dirty side (LP) of the filter and filtered material is conducted out from a clean side (PP) of the filter. A clogged filter is washed by counterflow washing in which the filtered material is conducted from the clean side of one filter to the clean side of another filter.

15 Claims, 2 Drawing Sheets

FILTER SYSTEM AND METHOD FOR FILTERING

CROSS-REFERENCE TO RELATED APPLICATION

This application is the U.S. national phase of PCT Application No. PCT/FI2021/050053 filed on Jan. 27, 2021, which claims priority to FI patent application No. 20205104 filed on Jan. 31, 2020, the disclosures of which are incorporated in their entirety by reference herein.

BACKGROUND OF THE INVENTION

The invention relates to a filter system intended for mechanical filtration in which particles are separated from a material to be filtered by means of filters.

Further, the invention relates to a method for filtering.

The object of the invention is described in more detail in the preambles of independent claims of the application.

When processing and treating different types of flowing materials, they often need to be subjected to various filtrations. The filtration may be performed using filters provided with filter members, through filter surfaces of which the material to be filtered is conducted and in which the particles larger than a desired particle size do not pass through the filter surfaces. However, over time these particles clog the filters and prevent the intended operation of the filters. To clean the filters, various solutions have been developed. However, it has been found that there are drawbacks in the current solutions.

BRIEF DESCRIPTION OF THE INVENTION

The idea of the invention is to provide a new and improved filter system and method for filtering.

The characteristic features of the filter system according to the invention are presented in the characterizing part of the independent device claim.

The characteristic features of the method according to the invention are presented in the characterizing part of the independent method claim.

The idea of the proposed solution is to use a filter system comprising at least two filters, a first filter and a second filter, for filtering a material to be filtered. The material to be filtered is conducted to a dirty side of the filter and filtered material exits the filter from its clean side during the normal filtration process. The filter system comprises a cleaning cycle utilizing counterflow cleaning. Filtered material having passed through one filter is conducted during the cleaning cycle from the clean side of that filter to the clean side of another filter, whereby it removes particles captured on the dirty side of the other filter based on the counterflow principle.

In other words, the solution is counterflow cleaning of the filter by the filtered material. Thereby a flow communication is opened between the filters, between the clean sides thereof, for the duration of the cleaning cycle.

One advantage of the proposed solution is that counterflow washing of the filter is performed using a material already filtered by some other filter of the filter system, whereby unfiltered material is not able to escape past the filter system during the cleaning cycle.

A further advantage is that the filter system does not require an external or separate cleaning device, because the cleaning cycle is performed by means of a counterflow washing arrangement integrated therein.

Yet one advantage is that, in the simplest form, the counterflow washing and its control require only the valves of the system to be controlled as required by the washing cycle.

The idea of one embodiment is that the filter system comprises two or more parallel-connected filters.

The idea of one embodiment is that the filter system comprises exactly two parallel-connected filters.

The idea of one embodiment is that the filters comprised by the filter system are similar to each other.

The idea of one embodiment is that the filter system comprises discharge channels that are connected with the dirty sides of the filters. Said discharge channels are provided with discharge valves for opening and closing a flow communication. Thereby the dirty side of a filter to be cleaned is connectable to the discharge channel during the counterflow washing. This way, large particles coming off the filter element can be conducted out from the filter.

According to one embodiment the above-mentioned discharge channels are connected with a process device in which the material to be filtered is pretreated before it is conducted back to the filter system. The process device may be for example a mixer or a dissolution unit. Thereby the waste material to be removed from the filter system during the cleaning cycle may be circulated for retreatment to the process device and again returned from there for filtration to the filter system. The process device may break down or dissolve the particles having been washed off from the filters to a smaller particle size, whereby they are able to pass through the filter members of the filters. This way, production of waste generated in cleaning of the filters is avoided and all material will be utilized as efficiently as possible.

The idea of one embodiment is that the valves are provided with actuators for opening and closing them automatically under control of a control system.

According to one embodiment, the valves may be automatic valves provided with pneumatic or electric actuators.

According to one embodiment, the control system comprises a logic circuit configured to control the actuators of the valves.

According to one embodiment, the control system is connected to form part of an automation system of production equipment. Thereby the automation system is configured to control the actuators of the valves.

According to one embodiment, the filter system comprises a control unit, in a processor of which at least one program is configured to be executed for controlling the actuators of the valves.

According to one embodiment, the control system comprises one or more washing cycles according to which the valves are controlled to provide desired flows and washing connections in the system.

According to one embodiment, a pressure difference over the filter, i.e. pressure on the dirty side before the filter member and pressure on the clean side after the filter member, is measured with a pressure measurement device. This way, the degree of clogging of the filter member may be determined in the control system based on a pressure drop or pressure difference caused by clogging. Based on these data, initiation of the cleaning cycle described in this document may be controlled and the cleaning cycles may be scheduled as appropriate between different filters.

The idea of one embodiment is that the filter system comprises at least one pump for increasing pressure of the filtered material being conducted out from the clean side of the filter.

The idea of one embodiment is that the above-mentioned pump is configured to increase the pressure of the filtered material being fed via the washing connection in counterflow washing.

According to one embodiment, said pump is configured to increase the pressure of the filtered material during the normal filtration process before the filtered material is conducted to next process stages. It may be necessary to increase the pressure in the treatment of high-viscosity materials, and when the next process stage requires a high pressure.

According to one embodiment, said pump is configured to be used for circulating a specific solvent material in the channels and filters of the filter system when the filter system is cleaned in whole, for example in connection with shutdown.

According to one embodiment, said control system, control unit and automation equipment may control, in addition to the valves, also the pump of the system or a motor or actuator driving it.

The idea of one embodiment is that the filter comprises a filter element through which the material to be filtered is conducted from the dirty side of the filter and through which the filtered material is able to pass to the clean side of the filter.

The idea of one embodiment is that the above-mentioned filter element comprises filtration openings, the size of which is 5-50 micrometres.

According to one embodiment, the filter element has a cylindrical shape.

According to one embodiment, the filter element is manufactured from a sintered multilayer mesh. The mesh of the filter element may be shaped into the form of a cylinder, for example by bending.

According to one embodiment, all channels leading to the dirty side of each filter and leading out from the clean side of the filter are closable by means of the valves. Thereby an individual filter is disconnectable from operation while the filtration continues by other filters of the filter system.

The idea of the one embodiment is that an individual filter may be disconnected from the filtration for the time of maintenance by means of the valves. After this, a housing, frame or other cover structure of the filter may be opened to replace the filter element. The filtration may continue uninterrupted in another or all other filters during the maintenance.

The idea of one embodiment is that the filter system is continuously-operated. Thereby new material to be filtered is continuously conducted to the system from a feed channel during the filtration and on the other hand, filtered material is continuously conducted out from the system to the next process device or process stage following the filtration.

The idea of one embodiment is that the proposed solution relates to a method that comprises utilizing, in counterflow cleaning of a filter, a material having been filtered by means of another filter.

The idea of one embodiment is that the filtered material used in the counterflow cleaning is conducted under pressure out from the filter system, whereby the access of air to the filter system is prevented.

The idea of one embodiment is that the filtered material used in the counterflow cleaning is returned back to a process preceding the filter system, such as for example to a dissolution process, mixing process or other process of the material to be filtered.

The idea of one embodiment is that a material that is a high-viscosity fluid mass is filtered. The mass may comprise fibres and liquid, such as water.

The idea of one embodiment is that the material to be filtered is a fluid mass comprising dissolving pulp.

The idea of one embodiment is that the material to be filtered is alternatively some other high-viscosity mass.

The idea of one embodiment is that the material to be filtered is alternatively a low-viscosity mass or mixture.

The idea of one embodiment is that the material to be filtered is alternatively a mixture of gas and particles.

The idea of one embodiment is that the material to be filtered is conducted under a pressure above 50 bar to the filters.

The above-presented embodiments and the features they contain may be combined to provide desired configurations.

BRIEF DESCRIPTION OF THE FIGURES

Some embodiments of the proposed solution are illustrated more specifically in the following figures, in which FIG. 1 schematically illustrates one filter system during a normal filtration process, and FIG. 2 schematically illustrates the filter system according to FIG. 1 during a washing cycle for one filter.

For clarity purposes, some embodiments of the proposed solutions are illustrated in a simplified form in the figures. The same reference numbers are used in the figures to denote the same elements and features.

DETAILED DESCRIPTION OF SOME EMBODIMENTS

Figure 1:
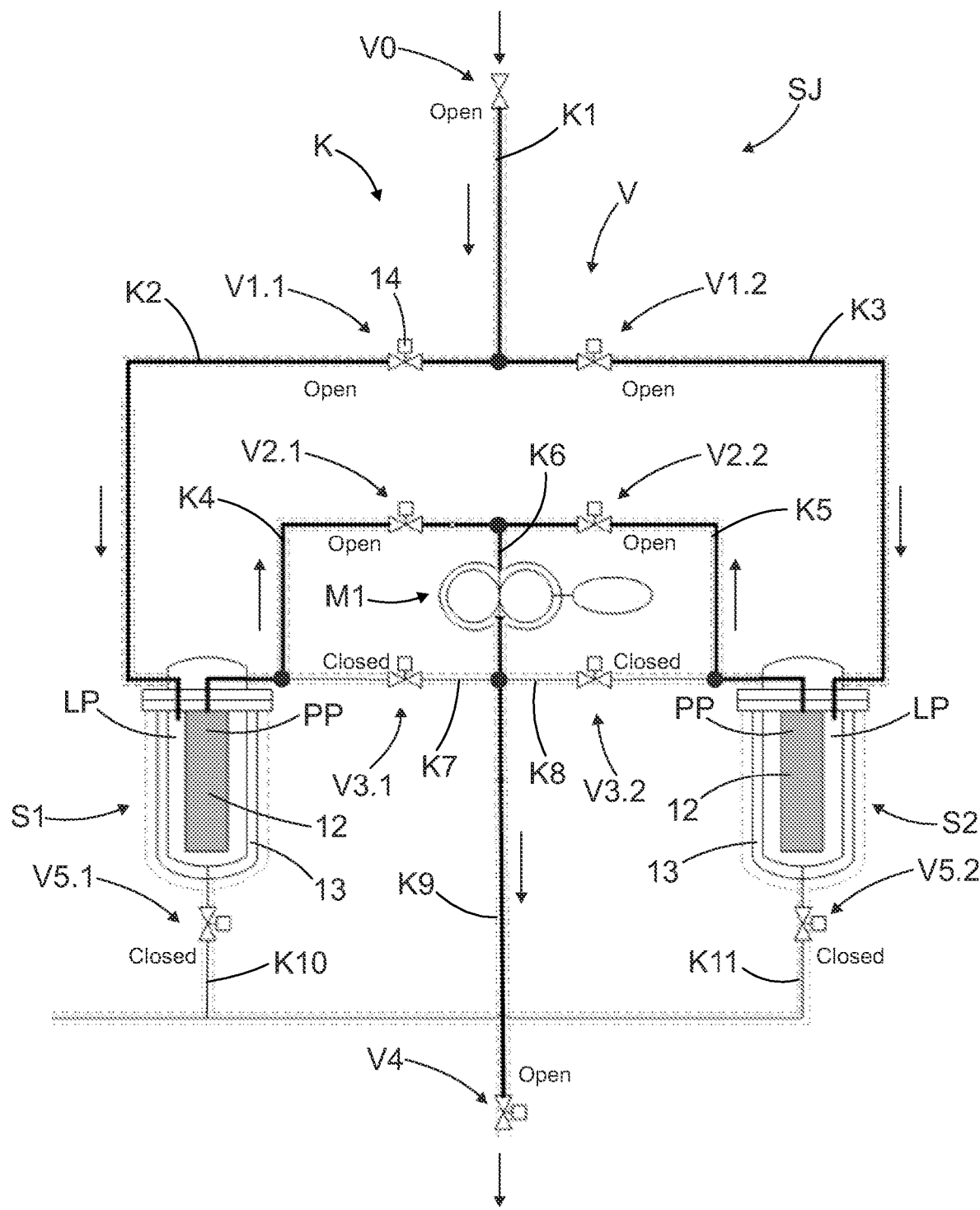

FIG. 1 illustrates one filter system SJ comprising at least two filters S1 and S2. The filters S1, S2 may be similar to each other and they may be connected to operate in parallel in the system SJ. Each filter S1, S2 comprises a filter member 12 that is accommodated in a housing 13 surrounding it. A material to be filtered is conducted to the filter system SJ along channel K1 and through valve V0. The material to be filtered is conducted further along channels K2 and K3 to a dirty side LP of the filters S1, S2, from where it passes by the effect of pressure through the filter member 12 to a clean side PP. Particles that are larger than the opening size of the filter member 12 do not pass through the openings, but remain at the surface of the filter member 12 on the dirty side LP. Filtered material may be conducted out from the clean side PP along channels K4-K9. Outlet channels K10 and K11 illustrated in FIGS. 1 and 2 are needed during cleaning cycles and venting of the filters S1, S2.

As may be seen, the filter system SJ comprises several valves V. The valves V may be controlled by means of a control system or automation, and the valves V may comprise actuators 14 by which they may be opened and closed. The filter system SJ may also comprise its own control unit for controlling the operation of the valves V. Further possible that the valves V are in some embodiments manually-operated valves.

The filter system SJ and its operating principle in normal filtration are illustrated in FIG. 1. Accordingly, in FIG. 1 the flows in the channels K during normal production of the system are indicated by arrows, and in addition the positions of the valves V are indicated for clarity reasons in connection with the valves. The valves V are normally set to positions enabling the flow through both of the filters S1, S2. Thereby valves V0, V1.1, V1.2, V2.1, V2.2 and V4 are open and both filters S1 and S2 filter the material to be filtered conducted through them. When only one filter S1 or S2 is used, for example during maintenance, valves V1.1 and V2.1 or V1.2 and V2.2 of the side under maintenance are closed. Thereby the flow passes in whole through one of the filters, leaving the other filter free of the flow.

Figure 2:
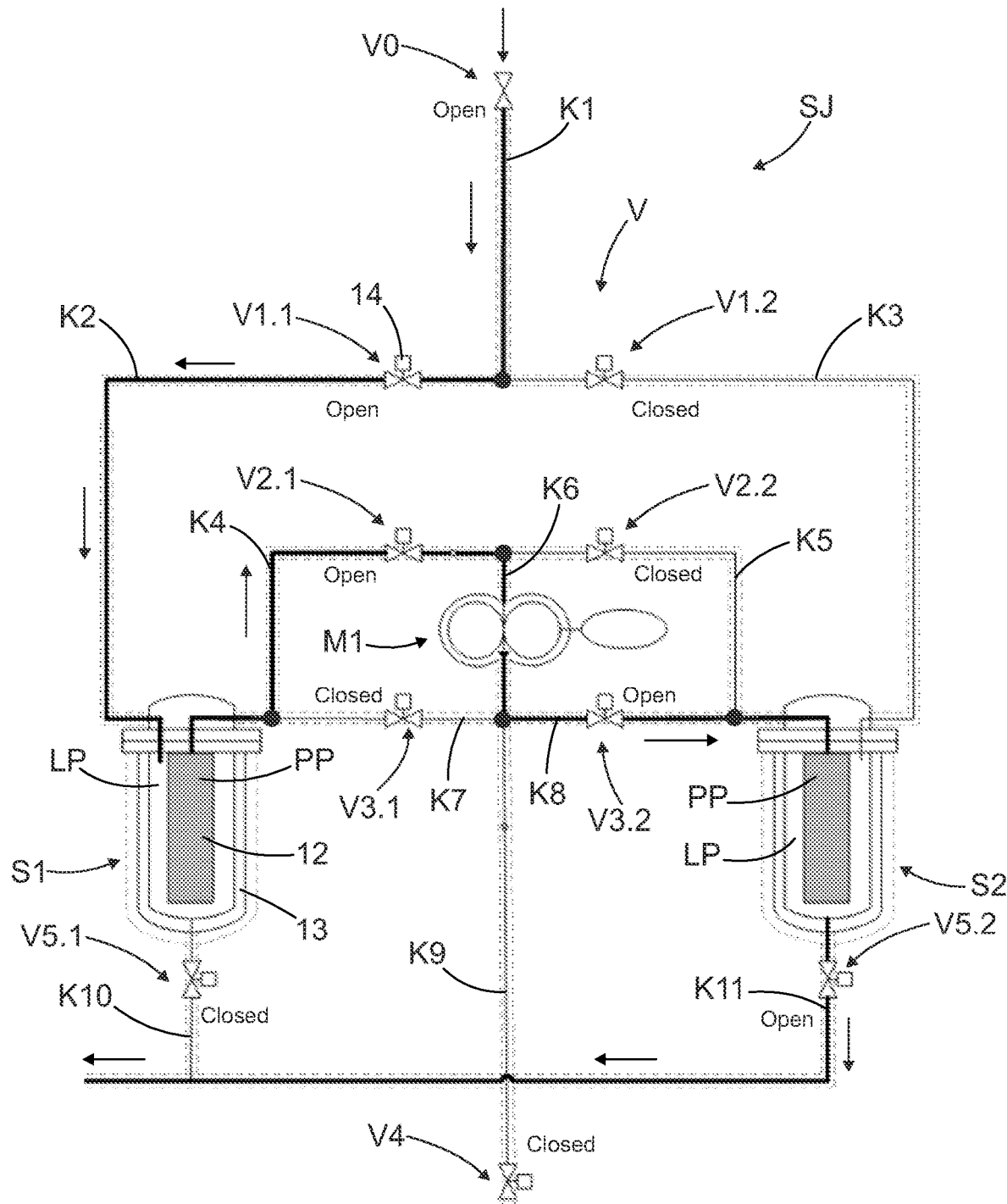

As illustrated in FIG. 2, for the time of cleaning the filters S1, S2 the positions of the valves V are changed from FIG. 1 in such a way that the flow of the material to be filtered to the filter S2 to be cleaned is prevented by closing the channels leading there by means of the valves. In FIG. 2, filter S2 is cleaned and filter S1 continues filtration. On the side to be cleaned, valves V1.2 and V2.2 are closed, whereby the flow of the material to be filtered is enabled only through filter S1. Next, an outlet valve V5.2 on the bottom of the filter S2 to be cleaned is opened to avoid overpressure at the beginning of the next stage. The cleaning is carried out by opening valve V3.2 of channel K8 leading back to the filter S2 to be cleaned after a pump M1, whereby the filtered material is able to flow from the clean side PP of filter S1 to the clean side PP of filter S2. Finally, valve V4 after the filters S1, S2 is closed, forcing all filtered material to momentarily flow through the filter S2 to be cleaned. This flow removes oversized particles from the filter surface of filter S2 and carries them out from the system via bottom valve V5.2.

In a similar manner, filter S1 may be cleaned by conducting filtered material to the clean side PP thereof from the clean side PP of filter S2 along channels K5, K6 and K7 and via valves V2.2 and V3.1 and the pump M1 to remove particles from the surface of the dirty side LP of the filter member. In this case the material removed in the counter-flow cleaning or washing is conducted out from the dirty side LP of filter S2 via outlet valve V5.1 and outlet channel K10.

When the material to be filtered is very high-viscosity and has a high flow resistance, the system may be provided with a pump M1. By means of the pump M1, sufficient pressure in the washing or cleaning cycle may be ensured. The pump M1 may also be used during normal filtration for raising pressure before the next process stage, i.e. to increase the pressure of the filtered material to be conducted through valve V4.

When the material to be filtered is easily flowable and fluid, the pressure at the passage through one of the filters S1, S2 does not necessarily drop so much that the remaining pressure would not be sufficient for running the cleaning cycle. In this case the filter system SJ may be configured without the pump M1. In a solution that is configured without the pump M1, the channels K may be arranged in simpler ways than in FIGS. 1 and 2. It may be possible, for example, to leave out channels K4 and K5 and valves V2.2 and V2.2, or alternatively, leave out channels K7 and K8 and valves V3.1 and V3.2. Channels K4, K5, K6, K7 and K8 illustrated in FIGS. 1 and 2 are needed when filtered material is driven via the pump M1 to channel K9 or is driven via the pump M1 for use in the cleaning cycles of the filters S1, S2.

If the filters S1, S2 are part of a dissolution process or the like in which the particles captured in the filters S1, S2 are for the most part undissolved material, the outlet flow of the cleaning cycle may be conducted back to the dissolution stage for retreatment along channels K10 and K11. This way, unnecessary waste generated in the cleaning is avoided. The cleaning cycles may be run at short intervals. At the end of the cleaning cycle the positions of the valves V are returned to the position corresponding to normal filtration, whereby the flow passes again through both of the filters S1, S2.

Clogging of the filters S1, S2 may be observed by arranging pressure sensors in the system on both sides of the filters S1, S2, i.e. on the dirty side LP and on the clean side PP. The necessary cleaning interval may be determined on the basis of the data obtained thereby. In the normal filtration operation of the system SJ, equal flows may be conducted through both of the filters S1, S2 and the clogging rate in the long run is generally approximately equal. To avoid a situation in which both filters S1, S2 clog up at the same time, the cleaning cycles of the filters S1, S2 may be scheduled for one side at a time. It may be advantageous to perform the cleaning on the dirtier filter when the cleaner filter has become half dirty.

The flow resistance through clean filters S1, S2 is significantly lower as compared to clogged ones, which means a smaller amount of energy required for the filtration and a greater mass flow. The system also offers a possibility to clean the filters automatically without a need to open the filter housing 13. The duration of the cycle can be kept short, when the cleaning is performed at an early stage before significant clogging of the filter.

In a continuously-operated process, at some point a situation is reached where the filter element 12 of the filter S1, S2 becomes so clogged up that the cleaning cycle is not sufficient and the filter element 12 must be replaced. By means of the system SJ it is possible to direct all material to be filtered through one filter and service the other one while production continues. In respect of servicing, what makes the system special is the possibility to vent the filter S1, S2 after replacement, such that no air bubbles are able to access the system. This may be carried out by first opening bottom valve V5.1 or V5.2 of filter S1 or S2. Next, valve V1.1 or V1.2 is opened, whereby part of the flow is conducted out from bottom valve V5.1 or V5.2 through filter S1 or S2, filling filter S1 or S2 with the mass. Full air removal is ensured by closing valve V4 and passing cleaned material from the clean side PP of one filter alternately through valves V2.1 or V2.2 and V3.1 or V3.2. After a sufficient mass flow, the positions of the valves V may be returned to the normal production position. Air removal from the filters S1, S2 may be performed accordingly also in the beginning of production. In this case it must be ensured that the material to be filtered has been passed through all of the channels before the actual production is started.

Air removal in the filtration of low-viscosity liquids may require installation of the filters S1, S2 with the outlet valve V5.1 and V5.2 facing upwards, i.e. upside down in comparison to what is shown in the figures. This way, faster passage of air out from the filter S1, S2 may be ensured.

It is possible to temper the filters S1, S2 by providing them with heaters or coolers that may be placed at the surface of the filter (for example a band resistor), or inside the filter (for example a pin resistor), or both, to ensure an even temperature. In combination with tempered process pipes or channels and valves, the system may be installed to form part of a production process of materials having a small operating temperature range.

The filter system SJ provided with several valves V and a pump M1 may be utilized during shutdown of the filtration process. Thereby it is possible to feed a solvent to the system SJ instead of the material to be filtered, such that first, the material being filtered is driven by means of it out from the channels as well as possible. After this the feeding is stopped and valves V0 and V4 are closed. Next, an open passage from the pump M1 back to the same pump is opened within the system SJ by changing the positions of the valves V. This can be done for example by forming an open circuit through valves V1.1, V1.2, V3.2, V2.1. Now the solvent may be circulated by the pump M1 within the filter system SJ. By means of the flow, a large part of undissolved material remaining in the filters S1, S2 can be removed. At the same time, the channels K are cleaned of the high-viscosity material being filtered which may have remained therein and the removal of which by other means is very difficult. This way the cleaning does not require separate chemicals, the full removal of which from the system SJ is challenging.

The system SJ has been developed primarily to form part of the production of dissolving pulp in an Ioncell process, but its operating principles are also functional in many other applications requiring filtration.

It is possible to gain particularly great advantage from the automatized cleaning in dissolution-based processes in which the starting materials are expensive, and in which all waste significantly reduces the productivity of the process.

On the other hand, one applicable operating situation may be one in which large particles are to be removed from a very fluid and inexpensive liquid, and fairly large waste is not significant.

When using the filter S1, S2 for filtering different materials, the frame and filter media of the filters may be selected so as to be suitable for the given material. One alternative is to manufacture the housing 13 of the filter and parts of the frame from acid-proof steel and use an element manufactured from a sintered multilayer mesh bent into a cylinder as the filter element 12. The multilayer mesh may be provided with a sufficiently rigid support mesh placed under finer filter cloths. High-viscosity materials require high pressure, even above 50 bar, for the passage through the filter S1, S2 and continuation of the flow to the following pump. A high pressure difference over the filter S1, S2 applies a high force to the surface of the filter element 12 in the direction of the surface normal, which force tends to collapse the filter element 12 in the direction of the flow. In order for the filter element 12 to withstand this force, it may be installed over a sufficiently robust support mesh. A structure bent to the form of a cylinder helps to distribute the force evenly throughout the whole area of the circumference and directs the effective forces perpendicularly to the centre axis of the filter element 12. As a result of the total impact of the forces, the structure becomes considerably more robust and the risk of buckling of the surface, which is the most likely damage mechanism applied to the filter element 12, is significantly reduced. This way the support structure may be kept reasonable and the filtration surface area of the filter element 12 sufficiently large. When the mass is driven out from the element during the cleaning cycle, the directions of the forces are reversed. This does not cause major challenges in terms of durability, because an even distribution of the force on the filter surface is realized practically automatically and generation of a buckling mechanism on the inner surface of the cylinder is very rare.

In the filtration of high-viscosity materials, the flow of the material and distribution of pressure evenly around the filter element 12 may be ensured with a suitable flow channel system that conducts the material to be filtered evenly around the filter element 12. In other case the effect of pressure at one point of the filter element 12 may be great and may cause a risk of buckling.

The operation of the filter system SJ is based on changing the positions of the valves V to perform different functions. It is possible to implement this with manual valves, but for smooth operation and to minimize user mistakes it is recommendable to use automatic valves. They may be for example valves V provided with pneumatic or electric actuators 14. The automation may be carried out with a simple logic circuit in which the positions of the valves corresponding to the desired functions are pre-installed. The system may also be run as part of the production automation system, whereby the performance of the cleaning cycles may be carried out for example on the basis of a pressure difference over the filter S1, S2.

It may be stated that the proposed solution comprises a device suitable for filtering high-viscosity masses and enabling automatic cleaning of the filters as part of continuously-operated production. At the same time, it is possible to keep the system airless by means thereof during the necessary replacements of the filter elements. When using the filter as part of the production of dissolution-based masses, the waste generated in the cleaning may be conducted back to the dissolution stage, whereby the undissolved particles pass again through the mixing stage. This way, production of waste generated in the cleaning of the filters is avoided, which enables running of the cleaning cycles at short intervals. This keeps the backpressure generated by the filter elements at a low level, due to which the production rate is kept high and the energy required for filtration remains low.
Presentation of the Filter System Development Project The aim of the project was to increase the production volume of Ioncell technology based fibres and to develop continuously-operated production. The technology is based on utilization of the wet spinning method in the production of fibres manufactured from dissolving pulp. In the process, ground and dried pulp is dissolved by means of an ionic liquid developed for the purpose into a homogeneous mass, the properties of which include high viscosity at the production temperature. The spinning is carried out by passing the mass through small holes at the wet spinning end, which is why the filtration must be performed with a fine filter element provided with a mesh size of 5-50 microns. The high viscosity in combination with the fine filter raises a requirement to use a high filtration pressure to guarantee the flow. The biggest filter stressing factor is caused by particles undissolved in the mass in the dissolution stage, which are easily formed due to the susceptibility to encapsulation of the pulp. These particles are large in relation to the filtration size, so they clog the filter elements relatively fast, which causes decreasing in the filtration rate.

When producing Ioncell fibres for research use on a batch basis, the filtration of the mass may be performed by an apparatus able to contain the whole amount to be produced at the same time. In this case it is not very significant if the filter clogs up fast, because the filter may be replaced after each use in connection with cleaning of the apparatus. In continuously-operated production, however, the filtration should not cause interruptions because the filter would need to be replaced at short intervals.

In batch-operated filtration, a fine-mesh woven multilayer steel wire net pressed tightly between two thick flanges provided with flow channels is used as the filter medium. The solution enables filtration at a sufficiently high pressure. The downside of the system is small filtration surface area relative to the size of the device. A larger surface area is obtained by bending the filtration medium to the form of a cylinder. The mechanical solutions of the support surfaces and sealings of the filter cloth are challenging, and do not function well other than when the mass is driven in one direction through the filter.

The aim in the development of the apparatus was to provide a continuously-operated production line that may be run without interruptions in the production. To enable continuous operation, simple cleaning of the filters, good pressure resistance, and runnability of the process without disturbances causing interruptions are specifically required of the system.

The filter system may consist of two or more filters or filter units connected in parallel to the production line and a set of automatic valves controlling the operation of the device. The system enables selecting to use either an individual filter or all of the filters simultaneously. The greatest advantage is obtained from the possibility to automatize the cleaning of the filters by utilizing counterflow washing of the clean mass, such that the particles being filtered are not able to bypass the filters in any circumstances. The cleaning cycle is also performed in such a way that the access of additional air to the system is prevented. Further, venting of the filters in the startup stage as well as after possible service operations has been enabled. Service operations implemented in the system do not cause interruptions in the production because they may be performed for one filter at a time.

The filter unit has been developed primarily for filtering very high-viscosity materials with which the pressure drop through the filter is significant. For the cleaning cycle based on back flow and maintenance of the magnitude of the mass flow to be possible, the system comprises an additional pump, the use of which is not necessary in the filtration of low-viscosity materials.

The figures and their description are only intended to illustrate the inventive idea. However, the scope of protection of the invention is defined in the claims of the application.

The invention claimed is:

1. A filter system for separating solid particles from a material to be filtered, the filter system comprising:
a first filter (S1) and a second filter (S2) each comprising a housing accommodating therein a filter element, a dirty side (LP) before the filter element for receiving the material to be filtered, and a clean side (PP) after the filter element for outputting filtered material having passed through the filter, the material to be filtered being conducted from the dirty side (LP) of the filter through the filter element of the filter to the clean side (PP) of the filter;
channels for conducting the material to be filtered to the dirty side (LP) of each filter (S1, S2) and for conducting the filtered material out from the clean side (PP) of each filter (S1, S2);
valves for opening and closing the channels (K);
a first washing connection in which the clean side (PP) of the first filter (S1) is connectable with the clean side (PP) of the second filter (S2);
a second washing connection in which the clean side (PP) of the second filter (S2) is connectable with the clean side (PP) of the first filter (S1);
whereby in both of the washing connections the filtered material is configured to be conducted through the given filter (S1, S2) to be washed from the clean side (PP) to the dirty side (LP) thereof to remove particles from the filter (S1, S2) to be washed by counterflow washing.

2. The filter system according to claim 1,
wherein the filter system further comprises discharge channels (K10, K11) connected with the dirty sides (LP) of the filters (S1, S2);
said discharge channels (K10, K11) are provided with discharge valves for opening and closing a flow connection;
and wherein the dirty side (LP) of the filter (S1, S2) to be cleaned is connectable to the discharge channel (K10, K11) in counterflow washing.

3. The filter system according to claim 1, wherein the valves are provided with actuators for opening and closing them automatically under control of a control system.

4. The filter system according to claim 1, wherein the filter system comprises at least one pump for increasing pressure of the filtered material being conducted out from the clean side (PP) of the filter (S1, S2).

5. The filter system according to claim 4, wherein said pump is configured to increase the pressure of the filtered material being fed via the washing connection in counterflow washing.

6. The filter system according to claim 1, wherein the filter element comprises filtration openings, the size of which is 5-50 micrometers.

7. The filter system according to claim 1, wherein all channels leading to the dirty side (LP) of each filter (S1, S2) and leading out from the clean side (PP) of the filter (S1, S2) are closable by means of the valves, whereby the individual filter (S1, S2) is disconnectable from filtration operation while the filtration continues in the filter system.

8. The filter system according to claim 1, wherein the filter system continuously operated.

9. A method for separating solid particles from a material to be filtered, the method comprising:
using a filter system comprising a first filter (S1) and a second filter (S2) each having a housing accommodating therein a filter element, a dirty side (LP) before the filter element for receiving a material to be filtered, and a clean side (PP) after the filter element for outputting filtered material having passed through the filter;
conducting a material to be filtered to the dirty side (LP) of the filters (S1, S2);
filtering particles from the material to be filtered by conducting the material to be filtered from the dirty side (LP) of the filters (S1, S2) through the filter element of the filters (S1, S2) to the clean side (PP) of the filters (S1, S2), whereby the filters (S1, S2) retain the particles on the dirty side (LP) of the filters;
conducting a filtered material out from the clean side (PP) of the filters (S1, S2);
and wherein flows of the material to be filtered and the filtered material in the filter system are controlled by means of valves;
wherein
the filtered material having passed through the first filter (S1) is conducted from the clean side (PP) of the first filter (S1) to the clean side (PP) of the second filter (S2);
and is used for counterflow washing of the second filter by being conducted through the second filter (S2) from the clean side (PP) of the second filter (S2) to the dirty side (LP) of the second filter (S2) to wash off and remove the particles retained on the dirty side (LP) of the second filter (S2).

10. The method according to claim 9, wherein the filtered material used in counterflow cleaning is conducted under pressure out from the filter system, whereby access of air to the filter system is prevented.

11. The method according to claim 8, wherein the filtered material used in counterflow cleaning is returned back to a process preceding the filter system.

12. The method according to claim 9, wherein
a material which is a high-viscosity fluid mass, and which mass comprises fibers, is filtered.

13. The method according to claim 9, wherein
the material to be filtered is conducted under a pressure above 50 bar to the filters (S1, S2).

14. The method according to claim 9, wherein
the filter system is provided with a venting function for removing air from the filter (S1, S2), which venting function comprises:

conducting the material to be filtered to the dirty side (LP) of the filter (S1, S2) and letting at the same time the material to be filtered and air on the dirty side (LP) to escape from the filter system via an outlet valve and an outlet channel (K10, K11); and conducting the filtered material to the clean side (PP) of the filter (S1, S2) from some other filter (S1, S2) and letting at the same time the filtered material and air on the clean side (PP) to escape from the filter system via the outlet valve and the outlet channel (K10, K11).

15. The method according to claim 9, wherein
a washing cycle and counterflow washing are performed by turns for all filters (S1, S2) of the filter system, and a material filtered by other parallel filters of the filter system is used in the counterflow washing.

* * * * *